(12) United States Patent
Trombley et al.

(10) Patent No.: US 7,192,088 B1
(45) Date of Patent: Mar. 20, 2007

(54) VEHICLE SEAT ASSEMBLY

(75) Inventors: Matthew T Trombley, Allen Park, MI (US); Eric A Woods, Allen Park, MI (US); Michael R Ferrari, Clair Shores, MI (US); David K Williams, South Lyon, MI (US); Mark A Folkert, Farmington Hills, MI (US); John G Malcolm, Windson (CA)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/162,096

(22) Filed: Aug. 29, 2005

(51) Int. Cl.
*B60N 2/02* (2006.01)

(52) U.S. Cl. .................. 297/335; 297/332; 297/333

(58) Field of Classification Search ............. 297/378.1, 297/378.11, 378.13, 378.14, 332, 333, 335, 297/326; 296/65.05
See application file for complete search history.

(56) References Cited

U.S. PATENT DOCUMENTS

| | | | | |
|---|---|---|---|---|
| 2,705,526 | A * | 4/1955 | Hoven et al. | 297/333 |
| 2,965,155 | A * | 12/1960 | Henrikson et al. | 297/333 |
| 3,567,281 | A * | 3/1971 | Barecki et al. | 297/333 |
| 4,603,830 | A * | 8/1986 | Franck | 248/575 |
| 4,957,321 | A | 9/1990 | Martin et al. | |
| 5,056,866 | A * | 10/1991 | Tobler | 297/303.3 |
| 5,280,987 | A | 1/1994 | Miller | |
| 6,375,255 | B1 * | 4/2002 | Maruta et al. | 297/15 |
| 6,499,787 | B2 | 12/2002 | Jach et al. | |
| 6,568,736 | B2 | 5/2003 | Jach et al. | |
| 6,705,658 | B2 | 3/2004 | Jach et al. | |
| 6,709,040 | B1 | 3/2004 | Drew et al. | |
| 6,746,083 | B2 | 6/2004 | Drew et al. | |
| 6,869,138 | B2 | 3/2005 | Rhodes et al. | |
| 6,896,309 | B2 * | 5/2005 | Satoh et al. | 296/65.09 |
| 2004/0046408 | A1 | 3/2004 | Satoh et al. | |
| 2005/0012373 | A1 | 1/2005 | Fujita et al. | |

FOREIGN PATENT DOCUMENTS

| | | |
|---|---|---|
| EP | 1 493 611 | 1/2005 |
| GB | 1 204 977 | 9/1970 |
| GB | 2 408 677 | 6/2005 |
| JP | 406144092 A * | 5/1994 |

OTHER PUBLICATIONS

Ralph Cannon (Examiner); Combined Search and Examination Report Under Sections 17 and 18(3), issued for application GB0616521.1; dated Nov. 1, 2006; 6 pages; UK Patent Office.

* cited by examiner

*Primary Examiner*—Joseph Edell
(74) *Attorney, Agent, or Firm*—Wood, Herron & Evans, L.L.P.

(57) ABSTRACT

A stowable seat assembly is provided for use with a vehicle having a floor and a recess formed therein. The assembly includes a seat and a pivot tube adapted to be secured to the vehicle floor, with the seat being operatively pivotal about the pivot tube between a first, collapsed position and a second, stowed position with the seat being at least partially stowed within the vehicle recess. The seat passes through a third, upright position intermediate the first and second positions as the seat is pivoted between the first and second positions. The assembly further includes a torsion rod mounted on the pivot tube and free to twist, with the torsion rod being operatively coupled to the seat during pivoting of the seat toward and away from the third, upright position. The torsion rod provides a first biasing torque for assisting pivotal movement of the seat from the stowed position toward the upright position and a second biasing torque for assisting pivotal movement of the seat from the collapsed position toward the upright position.

18 Claims, 9 Drawing Sheets

VEHICLE SEAT ASSEMBLY

FIELD OF THE INVENTION

The present invention relates to a vehicle seat assembly and, more particularly, to a stowable vehicle seat assembly incorporating a torsion rod that assists in rotating the seat assembly from either a rear stowed position or a forward collapsed position to a position intermediate the stowed and collapsed positions.

BACKGROUND OF THE INVENTION

With the advent of large motor vehicles such as minivans and sport utility vehicles, newer approaches to cargo storage have been required, as compared to the traditional trunk of an automobile. This is because such vehicles typically include a third row seat or seats positioned rearward of the two rows found in a typical automobile, with relatively small cargo volume existing between the third row seat(s) and the rear end of the vehicle.

One earlier approach to solve this problem provided one or more removable seats that could be disconnected and removed from the vehicle. However, this type of seating system was disadvantageous due to the need to disconnect individual seats from their anchored positions in the vehicle floor and to store the seats outside of the vehicle and then subsequently reattach them as additional passenger seating was required. As a result, such vehicles could be reconfigured only by expending considerable time to adapt to the changing needs regarding passenger capacity and cargo volume.

Another known approach to resolve the problem of insufficient cargo space is described as follows. In some vehicles, the seat backs of the second and third row of seats are pivotally connected to the seat bottom. The seatbacks are movable between an upright position, for the seating of an occupant, and a collapsed position, wherein the seat back is pivoted forward to a position above the seat bottom. It is sometimes desirable to reconfigure the seatback of the second row seat so that when the seatback is in its forward position a back surface of the seatback is generally horizontal. The back surface of the seatback can also be coplanar with the collapsed seat back of the third row seat. It is known to provide a panel which is manually moveable to a position to bridge the gap between the second and third row seats so that a relatively flat horizontal support surface is formed.

It is also known to provide a third row seat which is pivotable to a storage position within a recess formed in the vehicle floor for stowing the third row seat. The seat bottom has a rear portion which is pivotally mounted on the vehicle floor. The seat bottom includes an upper surface and a lower surface. A seat back is pivotally mounted on the seat bottom and is moveable to a collapsed position onto the upper surface of the seat bottom. Once the seat back is moved to its collapsed position, the combination of the seat bottom and the seat back are pivotable about 180 degrees to their storage position within the recess formed in the floor of the vehicle. Furthermore, it is also known in stowable seats of this type to provide a panel pivotally connected to a rear portion of a seat bottom, such that the panel is moveable to a generally horizontal deployed position which is generally coplanar with a lower surface of the seat bottom when the seat bottom is in the stowed position, as disclosed in U.S. Pat. Nos. 6,709,040 and 6,746,083, which are assigned to the common Assignee and are expressly incorporated by reference herein in their entirety.

SUMMARY OF THE INVENTION

According to a first aspect of the present invention, a stowable seat assembly is provided for use with a vehicle having a floor and a recess formed therein. The assembly includes a seat and a pivot tube adapted to be secured to the vehicle floor, with the seat being operatively pivotable about the pivot tube between a first, collapsed position and a second, stowed position with the seat being at least partially stowed within the vehicle recess. The seat passes through a third, upright position intermediate the first and second positions as the seat is pivoted between the first and second positions. A torsion rod is mounted on the pivot tube and is free to twist. The torsion rod is operatively coupled to the seat during pivoting of the seat toward and away from the third, upright position. The torsion rod provides a first biasing torque for assisting pivotal movement of the seat from the second stowed position toward the third, upright position and a second biasing torque for assisting pivotal movement of the seat from the first, collapsed position toward the third, upright position.

According to a second aspect of the present invention, a method is provided for making a stowable seat assembly having a seat for use in a vehicle having a floor and a recess formed therein. The method includes the steps of securing a pivot tube to the vehicle floor and pivotally coupling the seat to the pivot tube whereby the seat is pivotable about the pivot tube between a first, collapsed position and a second, stowed position with the seat being partially stowed within the vehicle recess, with the seat passing through a third, upright position intermediate the first and second positions as the seat is pivoted between the first and second positions. The method further includes the step of mounting a torsion rod on the pivot tube so the torsion rod is free to twist and coupling the torsion rod to the seat during pivoting of the seat toward and away from the third, upright position. The method additionally includes the steps of causing the torsion rod to be twisted or wound as the seat pivots away from the third, upright position and causing the torsion rod to unwind as the seat pivots toward the third, upright position.

BRIEF DESCRIPTION OF THE DRAWINGS

These and other features, aspects, and advantages of the present invention will be become better understood with regard to the following description, appended claims and accompanying drawings wherein:

DETAILED DESCRIPTION

Figure 1A:
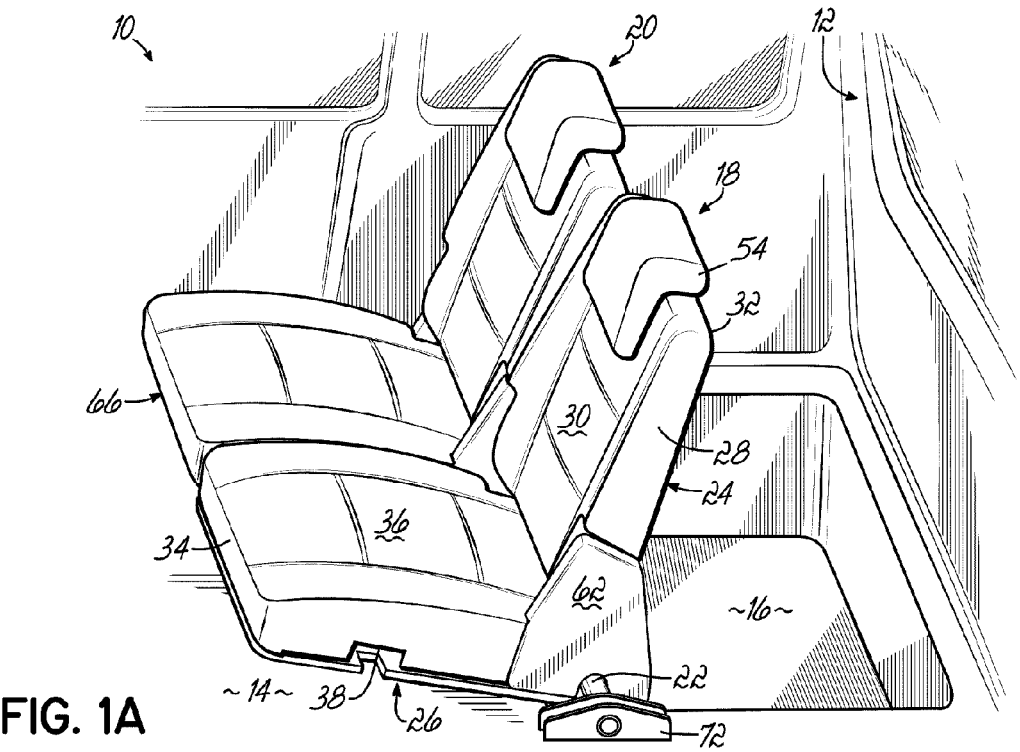
FIG. 1A is a perspective view of a seat assembly according to one embodiment of the present invention, with the seat backs of each included seat being in an upright, use or seating position.

Referring now to the drawings, FIG. 1A is a perspective view illustrating a seat assembly 10 according to the present invention. FIG. 1A illustrates the seat assembly 10 installed in a motor vehicle 12 (partially shown in FIG. 1A). The motor vehicle 12 includes a floor 14 and a recess 16 formed in the floor 14. The seat assembly 10 includes a first seat 18 and a second seat 20 which are individually pivotable, separate from one another, about a pivot tube 22 which is secured to the floor 14 of vehicle 12 in a subsequently described manner. The seats 18 and 20 are symmetrically opposite, or mirror images, of one another in structure and, accordingly, only seat 18 will be described in detail.

Seat 18 includes a seat back 24 and a seat bottom 26. The seat back 24 includes a cushion 28, having a forward surface 30 and a rear surface 32 (shown in FIG. 1B). The seat bottom 26 includes a cushion 34 having an upper surface 36 and a lower surface 38. In the use position illustrated in FIG. 1A, the forward surface 30 of the seat back 24 faces forwardly, while the rear surface 32 faces rearwardly. Additionally, in the use position shown in FIG. 1A, the upper surface 36 of seat cushion 34 faces upwardly.

Figure 1B:
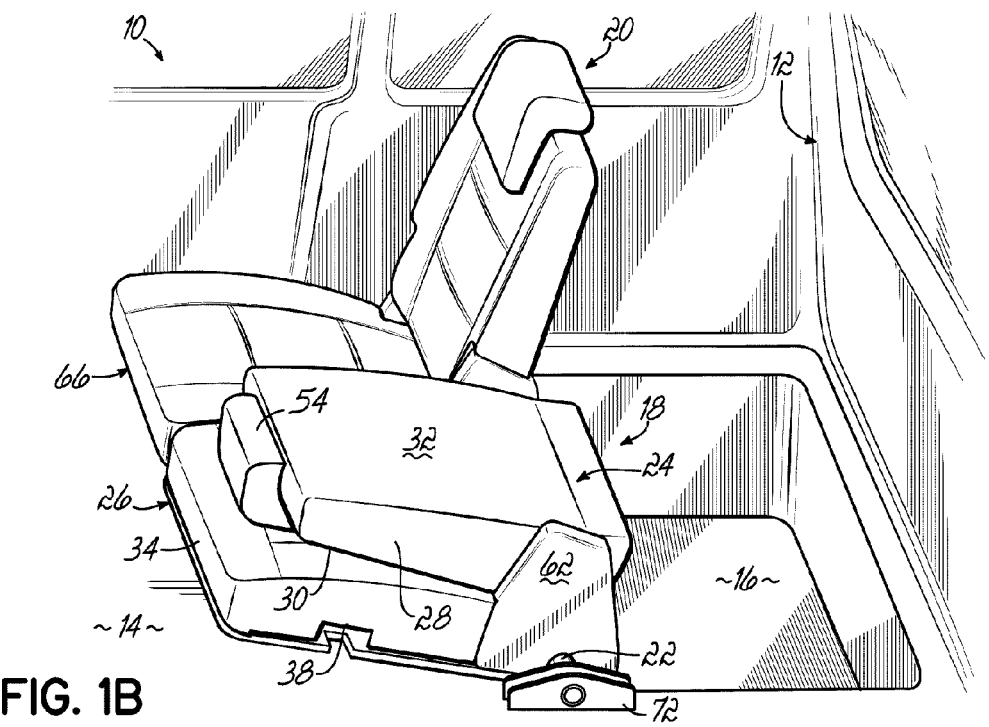
FIG. 1B is a perspective view similar to FIG. 1A, with the seat back of the left hand seat being rotated to a forward, collapsed position.

The seat back 24 is pivotal relative to the seat bottom 26, in a subsequently described manner. As shown in FIG. 1B, the seat back 24 is pivoted forward to a collapsed position such that the seat back 24 is in contacting engagement with the seat bottom 26 and the rear surface 32 of cushion 28 faces upwardly. The position of seat 18 shown in FIG. 1B corresponds to a collapsed position of the seat 18.

Figure 1C:
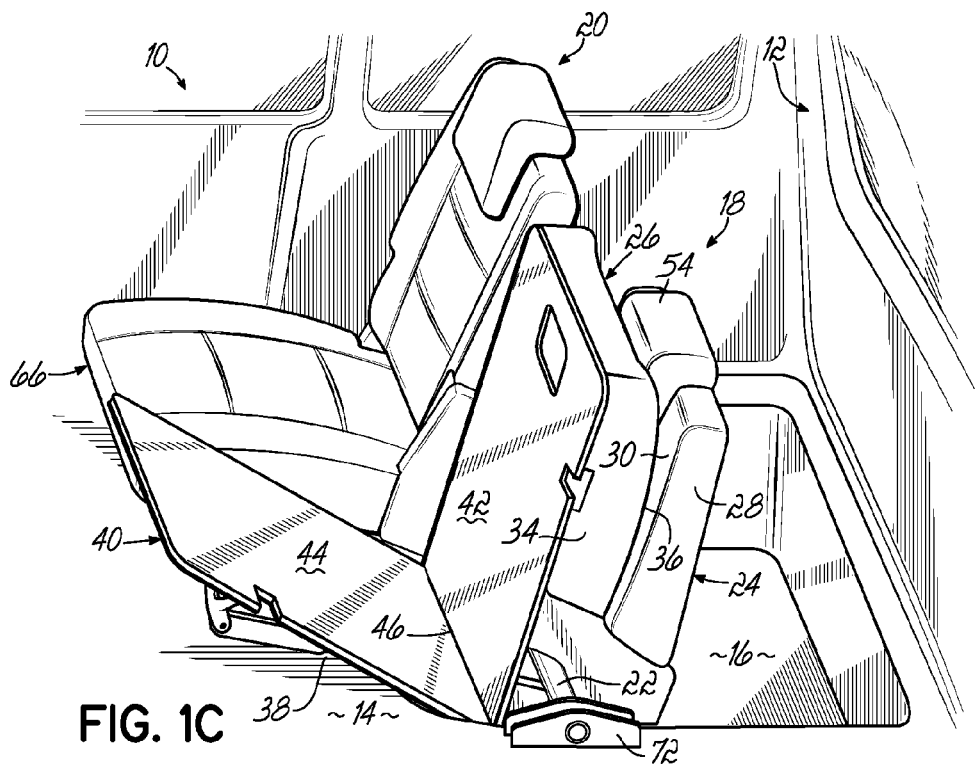
FIG. 1C is a perspective view similar to FIG. 1B, but with the seat back and seat bottom of the left hand seat rotated rearward to an intermediate position between the forward collapsed position and a rear stowed position.
Figure 1D:
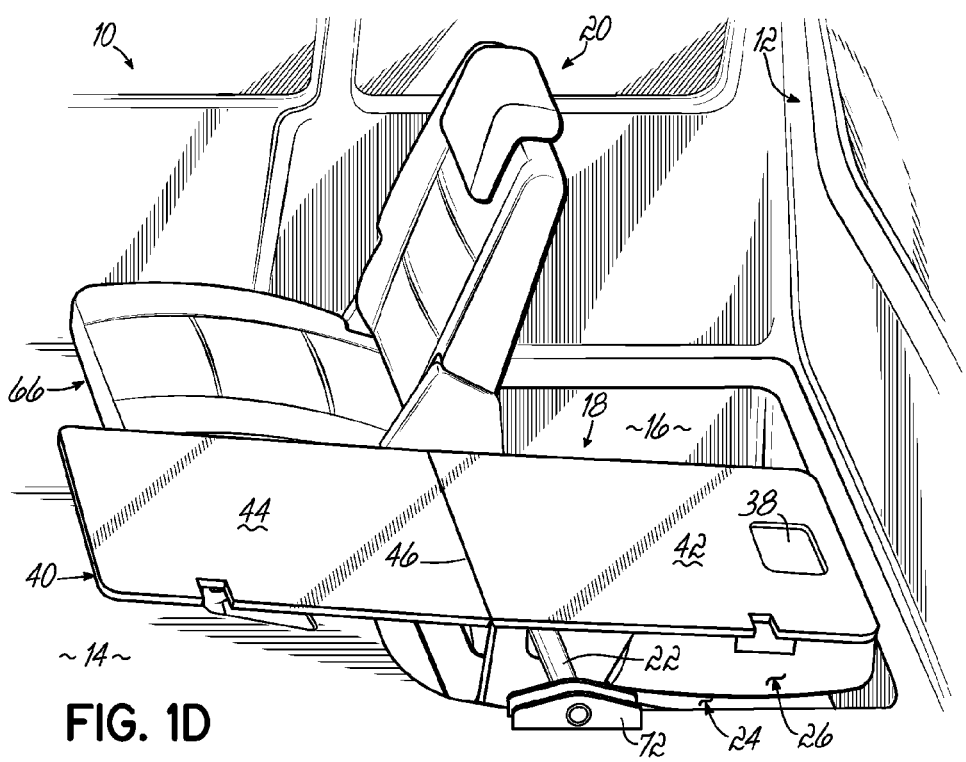
FIG. 1D is a perspective view similar to FIG. 1C, but with the left hand seat rotated to a fully stowed position.

FIG. 1D illustrates the seat 18 in a stowed position, with the seat 18 being at least partially stowed within the recess 16 of the vehicle 12. FIG. 1C illustrates seat 18 in an upright position that is intermediate the collapsed position shown in FIG. 1B and the stowed position shown in FIG. 1D. The intermediate position shown in FIG. 1C is about midway between the collapsed and stowed positions of seat 18 and is different than the use position illustrated in FIG. 1A. Seat 18 pivots about 180 degrees between the collapsed and stowed positions and accordingly, when seat 18 is in the intermediate position shown in FIG. 1C, it is about 90 degrees from the collapsed and stowed positions.

Seat 18 further includes an optional panel assembly, indicated generally at 40, with the assembly 40 including a first panel 42 and a second panel 44 hingedly connected to panel 42 by a hinge 46. Panel 42 is secured to the seat bottom 26 of seat 18 by one or more fasteners such as screws, clasps, etc. (not shown). When seat 18 is in the use position shown in FIG. 1A or the collapsed position shown in FIG. 1B, panels 42 and 44 are concealed beneath the seat bottom 26. However, when the seat 18 is in the stowed position shown in FIG. 1D, panels 42 and 44, together with similar panels (not shown) of seat 20 combine to form a relatively flat load floor that substantially covers the recess 16 of vehicle 12 and extends forward toward the next forward row of seats (not shown) in vehicle 12. When seat 18 is moved from the seating or use position shown in FIG. 1A to the stowed position shown in FIG. 1D, panel 44 automatically deploys from its concealed position, by a known mechanism such as the linkage shown in previously incorporated U.S. Pat. Nos. 6,709,040 and 6,746,083. In the illustrative embodiment, each of the panels 42 and 44 have a generally rectangular shape. However, the particular shape of panels 42 and 44, the means for deploying panel 44 and any other structural support means that may be required, such as that which is discussed in the previously incorporated patents, is known and does not form a part of the present invention.

Figure 2:
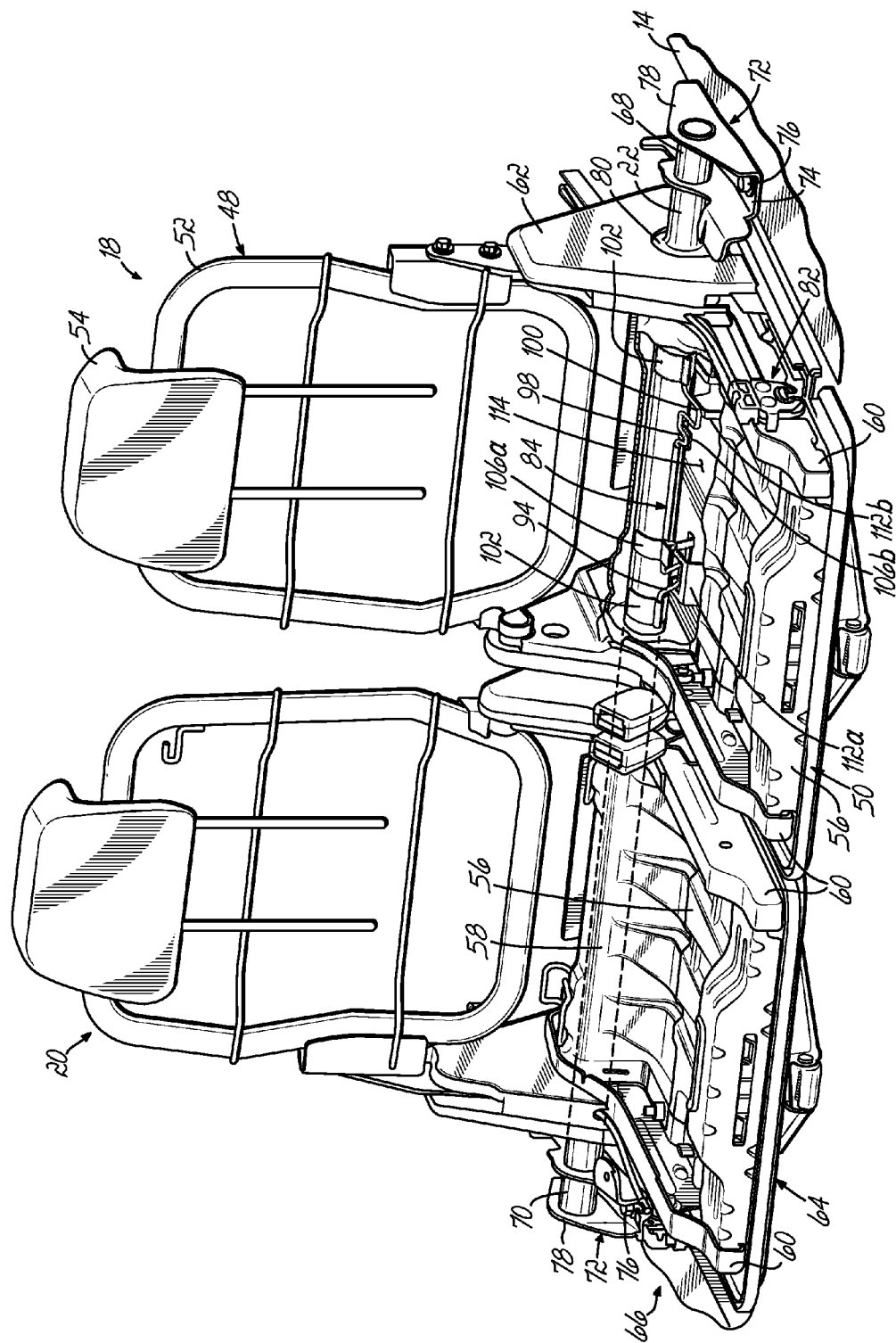
FIG. 2 is a perspective view further illustrating the construction of the seat assembly shown in FIGS. 1A–1D.

The seat back 24 and seat bottom 26 of seat 18 are each formed from a structural framework, indicated generally at 48 and 50, respectively, in FIG. 2 and the cushions 28 and 34 discussed previously that are illustrated in FIGS. 1A–1D. The seat cushions 28 and 34 can be made of any suitable material which provides a cushion support for the occupant. For example, the seat cushions 28 and 34 can be made of one or more layers of foam material attached to the corresponding framework and having an outer trim cover material adhered thereto. Examples of suitable cover materials are cloth, leather and vinyl.

The structural frameworks 48 and 50 can be made of any suitable material such as metal, plastics or composite which support an occupant of the seat assembly 10. In a preferred embodiment, the framework 48 of seat back 24 is a closed loop tubular member 52 that generally defines the shape of the seat back 24. A headrest 54 is mounted to the tubular member 52 by a mount structure (not shown).

The framework 50 of the seat bottom 26 generally includes a pan 56, having a raised rear portion 58, and a pair of side bars 60 attached to the pan 56. The framework 48 of the seatback 24 is pivotally attached to the framework 50 of the seat bottom 26 about a pivot axis (not shown).

The seat assembly 10 preferably includes a latch mechanism (not shown), such as that shown and described in the previously incorporated U.S. patents, for releasably securing the seat back 24 to its seating position relative to seat bottom 26 as shown in FIGS. 1A and 1B. The latch mechanism can be any suitable conventional latch mechanism as discussed in the previously incorporated U.S. patents. With regard to the seat 18 of the seat assembly 10 of the present invention, the latching mechanism is contained within a housing member 62 shown in FIG. 2.

The framework 50 of the seat bottom 26 of seat 18 and a framework 64 of a seat bottom 66 of seat 20, are pivotally attached relative to the vehicle floor 14 by the pivot tube 22 which extends laterally, substantially across the width of the vehicle 12. The framework 64 includes a pan 56, having a raised rear portion 58, and a pair of side bars 60 attached to the pan 56, as does framework 50 of seat 18 as discussed previously. Preferably, the pivot tube 22 has a cylindrical tubular cross-section and extends through both of the seats 18 and 20 such that the width of the pivot tube 22 is wider than the width of the seat bottoms 26 and 66 as may be appreciated with reference to FIG. 2. Accordingly, the pivot tube 22 has ends 68, 70 which extend beyond the outboard sides of the seats 18 and 20. As shown in FIG. 2, the pivot tube 22 is positioned underneath the raised rear portion 58 of pan 56 of seat 18 and the raised rear portion 58 of pan 56 of seat 20.

The ends 68, 70 of the pivot tube 22 are mounted on the floor 14 by brackets 72. If desired, the center portion (shown in phantom lines in FIG. 2.) of the pivot tube 22 can also be mounted on the vehicle floor 14 by another bracket (not shown). The brackets 72 include a lower plate 74 attached to the floor 14 by conventional means such as threaded fasteners 76. Each of the brackets 72 includes a pair of generally triangularly shaped flanges 78 that extend upwardly from the lower plate 74 and include apertures for receiving the pivot tube 22. The pivot tube 22 is fixed to the brackets 72 by conventional means such as welding, such that the pivot tube 22 cannot rotate relative to the brackets 72.

The framework 50 of the seat bottom 26 can be pivotally attached to the pivot tube 22 by any suitable manner. For example, pairs of spaced apart bushing or bearing assemblies, indicated generally at 80 (one partially shown in FIG. 2) can be installed onto the side bars 60 of the structural framework 50 of seat bottom 26. Preferably, the framework 50 of the seat bottom 26 is pivotally mounted on the pivot tube 22 at two distinct locations, such as the lateral sides of the framework 50. This mounting arrangement provides additional support for the seat 18, such as when subjected to lateral loads acting on the seat back 24 or about the center of gravity of the seat assembly.

Since the seat bottoms 26 and 66 of the seats 18 and 20 are pivotable relative to the vehicle floor 14, each seat 18 and 20 preferably includes a conventional latch assembly, indicated generally at 82 in FIG. 2, for releasable securing the seat bottoms 26 and 66 relative to the vehicle floor 14 and maintaining the seats 18 and 20 in their seating positions shown in FIG. 1A. The latch assembly 82 can be any suitable conventional latch mechanism.

Seat 18 is pivotable about the pivot tube 22 between the collapsed position shown in FIG. 1B and the stowed position shown in FIG. 1D, with the seat 18 being partially stowed within the vehicle recess 16 when it is in the stowed position shown in FIG. 1D. More particularly, seat 18 pivots about a centerline axis 57 of the pivot tube 22. When the seat 18 pivots between the collapsed and stowed positions or between the stowed and collapsed positions, the seat 18 passes through the upright position, shown in FIG. 1C, that is intermediate the collapsed and stowed positions. The upright position shown in FIG. 1C is different than the use or seating position shown in FIG. 1A. The upright position shown in FIG. 1C comprises a midway point of pivotable travel of the seat 18 and is not a use position. For instance, if the seat 18 pivots a total of about 180° between the collapsed position shown in FIG. 1B and the stowed position shown in FIG. 1D, the seat 18 is about 90° from each of the collapsed and stowed positions when it is in the upright position shown in FIG. 1C.

Referring now to FIGS. 3A–3C and 4A–4C, the seat assembly 10 includes a pair of torsion rods 84 (one shown), with one of the torsion rods 84 associated with each of the seats 18, 20. The torsion rods 84 can be made of spring steel or other materials having similar material properties as spring steel. The structural features and functions of the torsion rod 84 associated with the seat 18 will be subsequently described in detail with reference to FIGS. 2, 3A–3C and 4A–4C, and are the same as the features and functions of the torsion rod 84 associated with seat 20. The torsion rod 84 is mounted on the pivot tube 22 and is free to twist relative to the pivot tube 22. The torsion rod 84 is operatively coupled to the seat 18 during pivoting of the seat 18 toward and away from the upright position of the seat shown in FIG. 1C. Additionally, as subsequently discussed in greater detail, the torsion rod 84 is operatively effective for assisting pivotal movement of the seat 18 from the stowed position shown in FIG. 1D toward the upright position shown in FIG. 1C and from the collapsed position shown in FIG. 1B, toward the upright position shown in FIG. 1C.

Figure 4A:
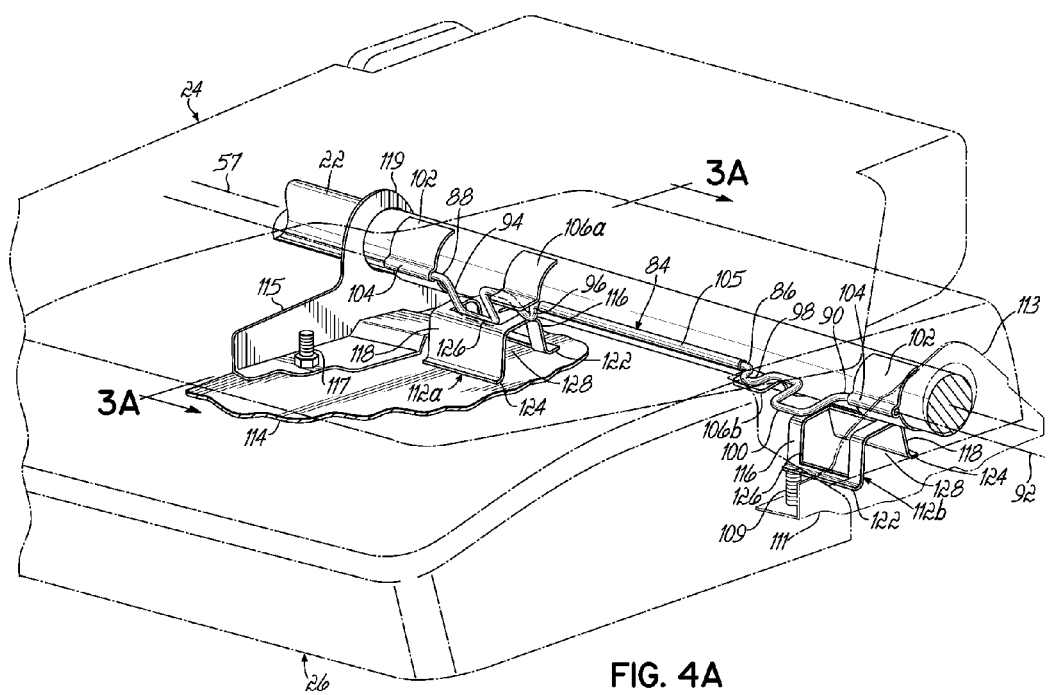
FIG. 4A is a perspective view further illustrating the seat assembly of the present invention with the left hand seat in the collapsed position shown in FIG. 1B.
Figure 4B:
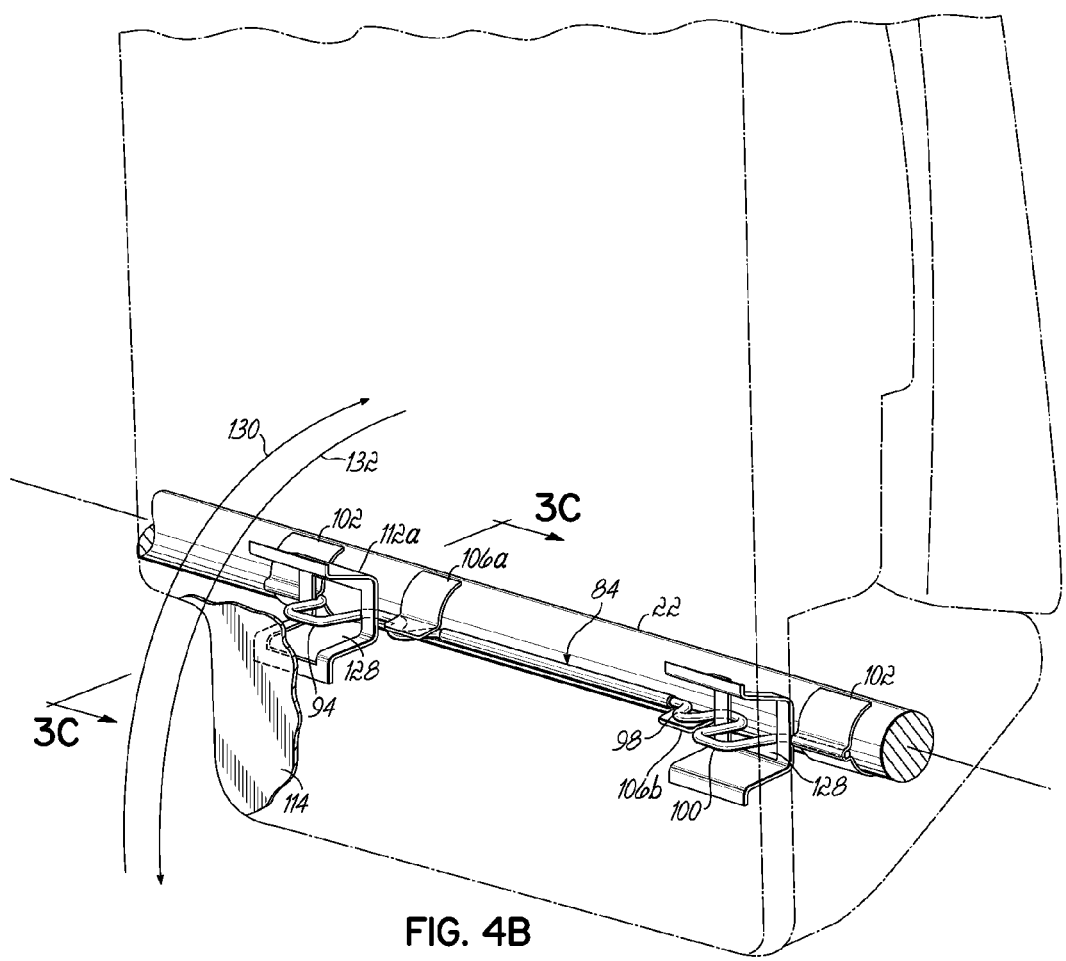
FIG. 4B is a perspective view further illustrating the seat assembly of the present invention with the left hand seat in the upright position shown in FIG. 1C.
Figure 4C:
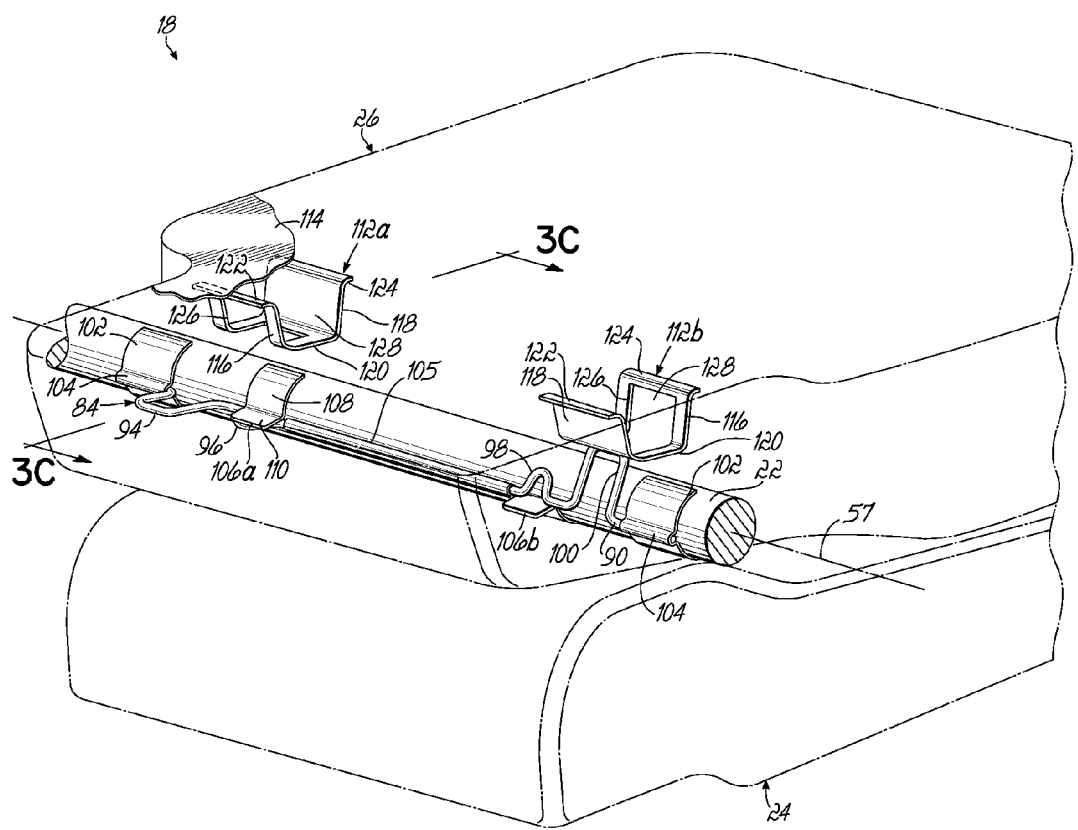
FIG. 4C is a perspective view further illustrating the seat assembly of the present invention with the left hand seat in the stowed position shown in FIG. 1D.

As shown in FIGS. 4A, 4B and 4C, the torsion rod 84 includes a centrally disposed portion 86, an inboard end 88 and an outboard end 90, with the inboard 88 and outboard 90 ends being coaxially disposed with the centrally disposed portion 86 of torsion rod 84. Torsion rod 84 includes a longitudinal centerline axis 92 that passes through the inboard end 88, centrally disposed portion 86 and the outboard end 90.

The torsion rod 84 further includes first 94 and second 96 protruding portions, disposed proximate the inboard end 88 of rod 84, and third 98 and fourth 100 protruding portions disposed proximate the outboard end 90 of torsion rod 84. Each of the protruding portions 94, 96, 98 and 100, protrude away from the longitudinal centerline axis 92. As shown in FIGS. 4A–4C, the first 94 and fourth 100 protruding portions are relatively larger than the second 96 and third 98 protruding portions. The protruding portions 94 and 100 are open loops having a generally U-shape. The relatively smaller protruding portions 96 and 98 also are open loops and have an arcuate shape. However, the protruding portions 94, 96, 98 and 100 can have other shapes, and can be substantially the same size as one another, within the scope of the present invention.

Seat assembly 10 further includes two pairs of collars 102 (one pair shown), with one pair being associated with each of the torsion rods 84. The collars 102 are fixed to pivot tube 22 by conventional means such as welding. Each of the collars has a raised portion 104 for receiving one of the ends 88, 90 of the torsion rod 84. The ends 88 and 90 are free to twist relative to pivot tube 22 within the raised portions 104 of the collars 102. The centrally disposed portion of rod 84 is substantially surrounded by a protective sheath 105 to prevent wear of either the pivot tube 22 or torsion rod 84, as torsion rod 84 twists relative to pivot tube 22 as subsequently discussed.

Seat assembly 10 also includes four rotation stops 106 (two shown), with two associated with each of the torsion rods 84. The inboard rotation stop is designated as stop 106a, while the outboard stop is designated as stop 106b. As shown in FIGS. 4A–4C, each of the stops 106a and 106b includes a first arcuate portion 108 attached to the pivot tube 22 by conventional means such as welding and a second portion 110 that extends away from the pivot tube 22.

The seat assembly 10 includes two pairs of brackets 112 (one pair shown) with one pair of the brackets 112 being associated with each of the seats 18, 20. As shown in FIGS. 3A–3C and 4A–4C, an inboard bracket, designated as 112a, and an outboard bracket, designated as 112b, are associated with the seat 18. The brackets 112a and 112b are fixedly attached by conventional means, such as welding, to a connector panel 114 (shown in cross-section in FIGS. 3A–3C; and shown in fragmentary view in FIG. 4A and omitted from FIGS. 4B and 4C for purposes of clarity of illustration). The connector panel 114 is fixedly connected to the pan 56 of the structural framework 50 of seatbottom 26 of seat 18 by brackets 111 and 115 that are attached to the pan 56 by conventional means, such as threaded fasteners that can include bolts 117 and associated nuts (one shown). Bracket 111 has an upstanding flange 113 having an aperture formed therein to receive pivot tube 22. Similarly, bracket 115 has an upstanding flange 119 having an aperture formed therein to receive pivot tube 22. Accordingly, the brackets 112a and 112b, as well as the connector panel 114, pivot with the structural framework 50 about the pivot tube 22, as the seat 18 is pivoted from one position to another.

Each of the brackets 112a and 112b include first 116 and second 118 end walls and a central portion 120 integral with and interconnecting the end walls 116 and 118. The endwalls 116 and 118 terminate in out-turned flanges 122 and 124, respectively. The flanges 122, 124 are fixedly attached to the connector panel 114 by conventional means, such as welding. Each of the brackets 112a and 112b further includes a notch 126 formed therein. As may be appreciated with reference to FIGS. 4A–4C, the notch 126 is formed in portions of the endwall 116 and central portion 122. The presence of the notches 122 permits the protruding portion 94 of torsion rod 84 to protrude through the notch 122 of bracket 112a into an interior space 128 defined by bracket 112a. Similarly, the notch 122 formed in bracket 112b allows the protruding portion 100 of torsion rod 84 to protrude through the notch 122 of bracket 112b into the interior space 128 defined by bracket 112b. The brackets 112a and 112b are oriented differently on connector panel 114. More particularly, the endwalls 116 of the brackets 112a and 112b are facing in substantially opposite directions. As may be appreciated with reference to FIGS. 3A–3C and 4A–4C, as well as the subsequent discussion, this allows one of the brackets 112a, 112b to be engaged with the torsion rod 84 while the other of the brackets 112a, 112b is disengaged from the torsion rod 84 as the seat 18 pivots away from or toward the upright position shown in FIG. 1C.

Figure 3A:
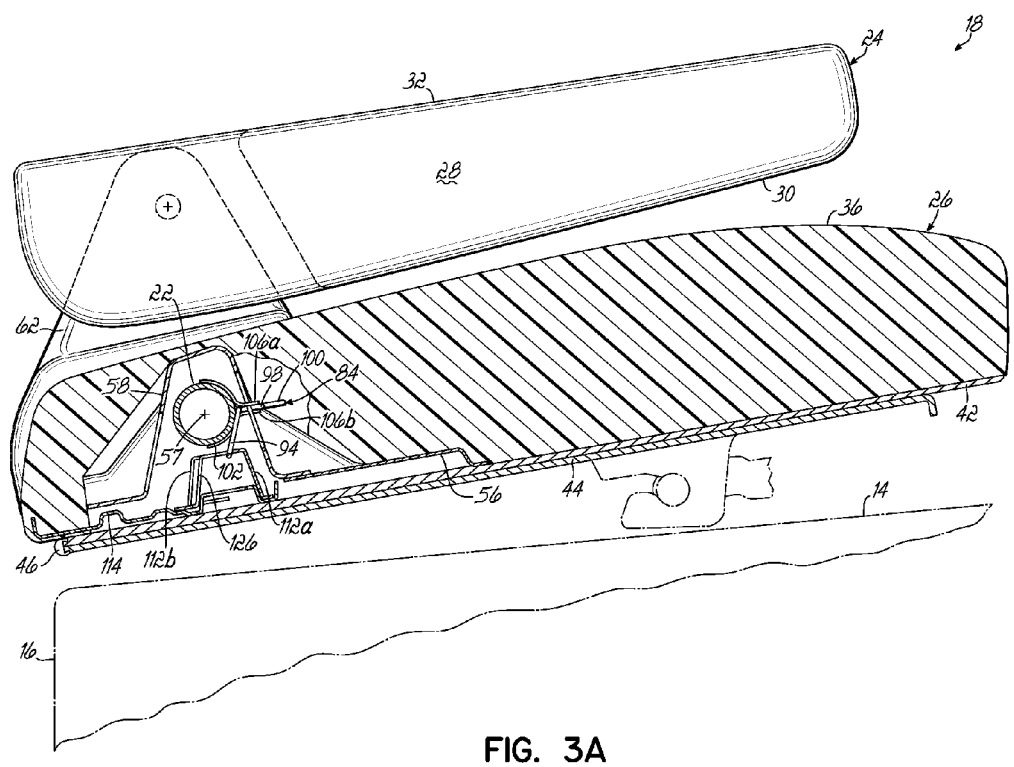
FIG. 3A is a cross-sectional view taken along line 3A—3A in FIG. 4A.
Figure 3B:
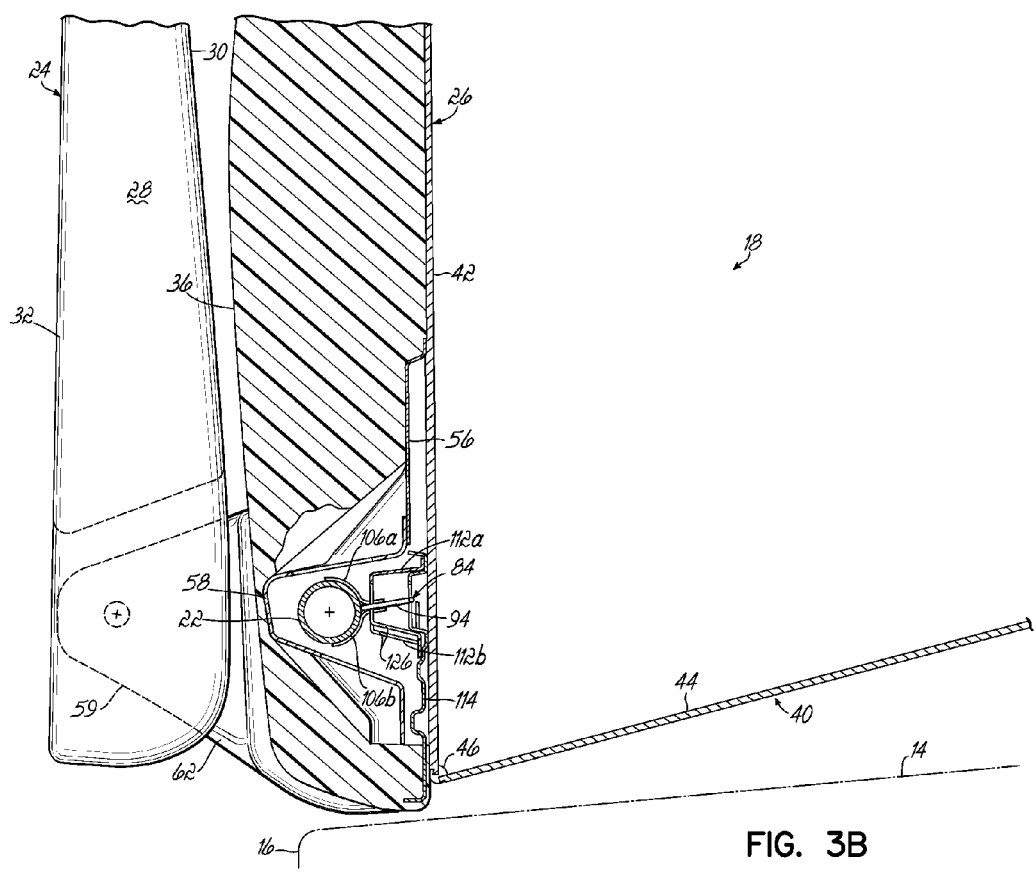
FIG. 3B is a cross-sectional view taken along line 3B—3B in FIG. 4B.

The torsion rod 84 is in a free-state, unwound condition and is not engaged with either of the brackets 112a and 112b when the seat 18 is in the upright position illustrated in FIGS. 1C, 3B and 4B. Instead, the protruding portion 94 protrudes through notch 122 and into the interior space 128 defined by inboard bracket 112a without engaging endwalls 116 and 118. Similarly, the protruding portion 100 of torsion rod 84 protrudes through notch 122 and into the interior space 128 defined by the outboard bracket 112b without engaging endwalls 116 and 118.

Figure 3C:
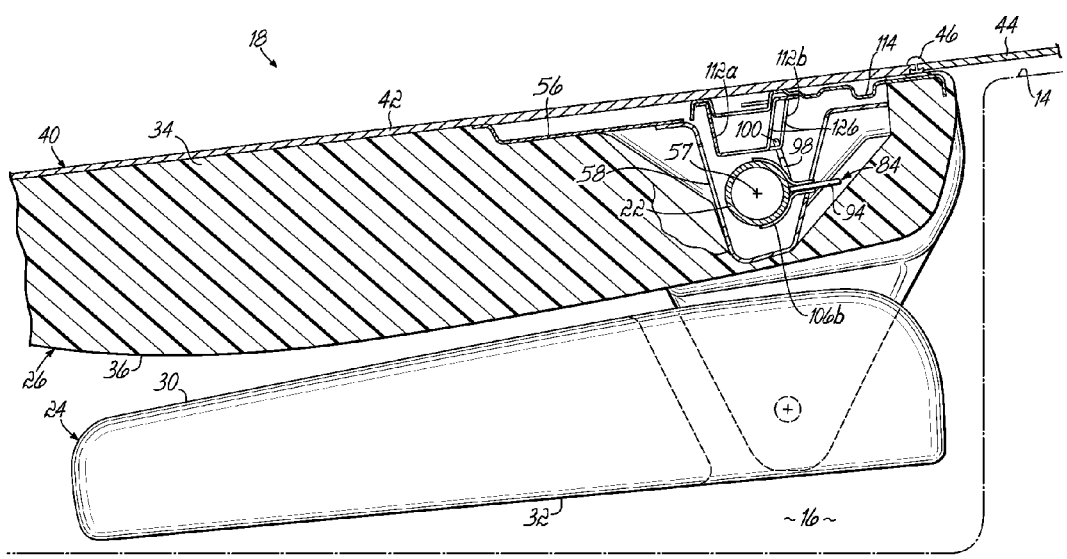
FIG. 3C is a cross-sectional view taken along line 3C—3C in FIG. 4C.

In use, as the seat 18 is pivoted in a first direction indicated at 130 in FIG. 4B away from the upright position shown in FIGS. 1C, 3B and 4B toward the stowed position shown in FIGS. 1D, 3C and 4C, the protruding portion 96 of torsion rod 84 engages the inboard rotation stop 106a, while the protruding portion 100 of torsion rod 84 engages the wall 118 of the outboard bracket 112b, causing the torsion rod 84 to be twisted, or wound in direction 130, until the torsion rod 84 is fully wound in this direction as illustrated in FIG. 4C. In this position, the torsion rod 84 possesses potential energy. When an operator of the vehicle 12 desires to pivot the seat 18 from the stowed position shown in FIGS. 1D, 3C and 4C to the collapsed position shown in FIGS. 1B, 3A and 4A, the torsion rod 84 exerts a first biasing torque on the outboard bracket 112b in the direction of rotational movement until seat 18 reaches the upright position shown in FIGS. 1C, 3B and 4B. Accordingly, torsion rod 84 assists the operator in pivoting the seat 18 from the stowed position to the upright position. In the upright position, the torsion rod 84 is completely unwound and does not exert a torque on the bracket 112b. The first biasing torque has a variable magnitude, with the maximum magnitude existing when the seat 18 is in the stowed position shown in FIGS. 1D, 3C and 4C. The magnitude of the first biasing torque decreases as the seat 18 is rotated away from the stowed position until it is zero when the seat 18 is in the upright position shown in FIGS. 1C, 3B and 4B.

As the operator further pivots or rotates the seat 18 in direction 132 shown in FIG. 4B away from the upright position shown in FIGS. 1C, 3B and 4B toward the collapsed position shown in FIGS. 1B, 3A and 4A, the protruding portion 98 of torsion rod 84 engages the outboard rotation stop 106b, while the protruding portion 94 of torsion rod 84 engages the inboard bracket 112a, causing the torsion rod to be twisted or wound between protruding portions 98 and 94 in the direction of rotation. The torsion rod 84 is fully wound in this direction when the seat is in the collapsed position shown in FIGS. 1B, 3A and 4A. In this position, the torsion rod 84 again has potential energy. When the operator desires to rotate the seat 18 from the collapsed position shown in FIGS. 1B, 3A and 4A to the stowed position shown in FIGS. 1D, 3C and 4C, the protruding portion 94 of torsion rod 84 exerts a second biasing torque on the inboard bracket 112a in the direction of rotational movement until the seat reaches the upright position shown in FIGS. 1C, 3B and 4B. Accordingly, torsion rod 84 assists the operator in pivoting or rotating the seat 18 from the collapsed position toward the upright position. The second biasing torque also has a variable magnitude, with the maximum magnitude existing when the seat 18 is in the collapsed position shown in FIGS. 1B, 3A and 4A. The magnitude of the second biasing torque decreases as the seat 18 is rotated away from the collapsed position toward the upright position shown in FIGS. 1C, 3B and 4B. The first and second biasing torques act in different directions from one another but in one embodiment they have substantially the same maximum magnitude, or scalar value. In other embodiments, the first and second biasing torques can have different maximum magnitudes, depending upon the particular application of seat assembly 10.

The seats 18 and 20 are pivotable independently of one another about the centerline axis 57 of pivot tube 22. Accordingly, one of the seats 18, 20 can be in a stowed position for instance, while the other of the seats 18, 20 can be in a use position to support an occupant. Torque-assist is provided for each of the seats by the torsion rods 84 and associated collars 102, rotation stops 106 and brackets 112 as discussed and illustrated with respect to seat 18.

The torsion rods 84 of the present invention, and the associated rotation stops 106a, 106b and brackets 112a, 112b have been illustrated as part of seat assembly 10, which is a manually operated seat assembly. However, the torsion rods 84 and associated rotation stops 106a, 106b and brackets 112a, 112b can also be advantageously utilized with a powered seat assembly such as that described in pending U.S. patent application entitled "Seat Assembly with Automatic Stow Feature," having Ser. No. 10/907,039, filed Mar. 17, 2005, which is expressly incorporated by reference herein in its entirety. When used with a powered seat assembly, the torque-assist provided by torsion rod 84 in pivoting from either the stowed or collapsed position toward the upright position allows the use of a lower torque and lighter weight motor to provide the remaining torque necessary to pivot the corresponding seat.

While the foregoing description has set forth preferred embodiments of the present invention in particular detail, it must be understood that numerous modifications, substitutions and changes can be undertaken without departing from the true spirit and scope of the present invention as defined by the ensuing claims. The invention is therefore not limited to specific embodiments as described, but is only limited as defined by the following claims.

What is claimed is:

1. A stowable seat assembly for use with a vehicle having a floor and a recess formed therein, said assembly comprising:
   a seat;
   a pivot tube adapted to be secured to the vehicle floor, said pivot tube being stationary, said seat being operatively pivotable about said pivot tube between a first, collapsed position and a second, stowed position with said seat being at least partially stowed within the vehicle recess, said seat passing through a third, upright position intermediate said first and second positions as said seat is pivoted between said first and second positions; and a torsion rod mounted on said pivot tube, said torsion rod being free to twist and operatively coupled to said seat during pivoting of said seat toward and away from said third, upright position, said torsion rod providing a first biasing torque for assisting pivotal movement of said seat from said second, stowed position toward said third, upright position and a second biasing torque for assisting pivotal movement of said seat from said first, collapsed position toward said third, upright position.

2. A seat assembly as recited in claim 1, further comprising:

a pair of rotation stops, each secured to said pivot tube and spaced apart from one another; and a pair of brackets, each connected to said seat for pivoting therewith about said pivot tube; wherein one of said stops and one of said brackets are operatively effective for engaging said torsion rod, causing said torsion rod to be wound or twisted therebetween, as said seat is pivoted away from said third, intermediate position toward one of said first, collapsed position and said second stowed position; and said one of said stops and said one of said brackets are operatively effective for engaging said torsion rod as said seat is pivoted from said one of said first, collapsed position and said second, stowed position toward said third, upright position as said torsion rod unwinds and exerts one of said first and second biasing torques on said one of said brackets thereby assisting an operator in pivoting said seat toward said third, upright position.

3. A seat assembly as recited in claim 2, wherein:

said pair of rotation stops comprise inboard and outboard stops;

said pair of brackets comprise inboard and outboard brackets;

said inboard stop and said outboard bracket are operatively effective for engaging said torsion rod as said seat is pivoted away from said third, upright position toward said one of said first, collapsed position and said second, stowed position and as said seat is pivoted from said one of said first, collapsed position and said second, stowed position toward said third upright position.

4. A seat assembly as recited in claim 3, wherein:

said outboard stop and said inboard bracket are operatively effective for engaging said torsion rod as said seat is pivoted away from said third, upright position toward the other of said first, collapsed position and said second, stowed position and as said seat is pivoted from the other of said first, collapsed position and said second, stowed position toward said third, upright position.

5. A seat assembly as recited in claim 2, wherein:

said pair of brackets are disengaged from said torsion rod when said seat is in said third, upright position and said torsion rod is in a free-state, unwound condition.

6. A seat assembly as recited in claim 2, wherein:

said torsion rod includes a centrally disposed portion and a longitudinal centerline axis passing through said centrally disposed portion;

said torsion rod further includes a plurality of protruding portions, each of said protruding portions protruding away from said centerline axis; and wherein a first one of said protruding portions engages said one of said stops and a second one of said protruding portions engages said one of said brackets as said seat is pivoted away from said third, upright position toward said one of said first, collapsed position and said second, stowed position, and as said seat is pivoted from said one of said first, collapsed position and said second, stowed position toward said third, upright position.

7. A seat assembly as recited in claim 1, further comprising:

inboard and outboard collars secured to said pivot tube; wherein said torsion rod includes inboard and outboard ends, said inboard end being disposed within said inboard collar and free to twist relative to said pivot tube within said inboard collar;

said outboard end being disposed within said outboard collar and free to twist relative to said pivot tube within said outboard collar.

8. A seat assembly as recited in claim 7, wherein:

said torsion rod further includes a centrally disposed portion intermediate said inboard and outboard ends;

said inboard and outboard ends of said torsion rod are coaxially disposed with said centrally disposed portion of said torsion rod.

9. A seat assembly as recited in claim 1:

wherein said torsion rod includes;

inboard and outboard ends;

a centrally disposed portion intermediate said inboard and outboard ends; and a pair of outboard protruding portions disposed intermediate said centrally disposed portion and said outboard end and a pair of inboard protruding portions disposed intermediate said centrally disposed portion and said inboard end.

10. A seat assembly as recited in claim 9, wherein:

said torsion rod is in a free-state, unwound condition when said seat is in said third, upright position;

each one of said pair of outboard protruding portions and each one of said pair of inboard protruding portions are substantially co-planar with one another when said torsion rod is in said free-state unwound condition.

11. A seat assembly as recited in claim 10, wherein:

each one of said inboard protruding portions and each one of said outboard protruding portions comprises an open loop.

12. A seat assembly as recited in claim 1, wherein:

said seat includes a seat back and a seat bottom, said seat back being pivotal relative to said seat bottom;

said seat back being pivoted forward into contacting engagement with said seat bottom when said seat is in said first, collapsed position;

said seat back and said seat bottom being operably pivotable together between said first, collapsed position and said second, stowed position, passing through said third, upright position as said seat back and said seat bottom are pivoted together between said collapsed and stowed positions.

13. A seat assembly as recited in claim 12, further comprising:

a connector panel pivotally coupled to said pivot tube; wherein said seat bottom includes a framework secured to said connector panel for pivoting therewith about said pivot tube.

14. A seat assembly as recited in claim 2, further comprising:
a connector panel pivotally coupled to said pivot tube; wherein
said pair of brackets are secured to said connector panel and are pivotal therewith about said pivot tube.

15. A seat assembly as recited in claim 14, wherein:
said pair of brackets comprise an inboard bracket and an outboard bracket;
said pair of rotation stops comprise an inboard rotation stop and an outboard rotation stop;
said inboard stop and said outboard bracket are operatively effective for engaging said torsion rod, causing said torsion rod to be wound or twisted therebetween, as said seat is pivoted from said third, upright position toward one of said first, collapsed position and said second, stowed position;
said inboard stop and said outboard bracket are operatively effective for engaging said torsion rod as said seat is pivoted from one of said first, collapsed position and said second, stowed position toward said third, upright position as said torsion rod unwinds and exerts said one of said first and second biasing torques on said outboard bracket thereby assisting an operator in pivoting said seat toward said third, upright position.

16. A seat assembly as recited in claim 15, wherein:
said outboard stop and said inboard bracket are operatively effective for engaging said torsion rod, causing said torsion rod to be wound or twisted therebetween, as said seat is pivoted from said third, intermediate position toward the other of said first, collapsed position and said second, stowed position;
said outboard stop and said inboard bracket are operatively effective for engaging said torsion rod as said seat is pivoted from the other of said first, collapsed position and said second, stowed position toward said third, upright position as said torsion rod unwinds and exerts the other of said first and second biasing torques on said inboard bracket thereby assisting an operator in pivoting said seat toward said third, upright position.

17. A method of making a stowable seat assembly having a seat for use in a vehicle having a floor and a recess formed therein, said method comprising the steps of:

securing a pivot tube to the vehicle floor, said pivot tube being stationary;
pivotally coupling the seat to the pivot tube whereby the seat is pivotable about the pivot tube between a first, collapsed position and a second, stowed position with the seat being at least partially stowed within the vehicle recess, the seat passing through a third, upright position intermediate the first and second positions as the seat is pivoted between the first and second positions;
mounting a torsion rod on said pivot tube so the torsion rod is free to twist;
coupling the torsion rod to the seat during pivoting of the seat toward and away from the third, upright position;
causing the torsion rod to be twisted or wound as the seat pivots away from the third, upright position;
causing the torsion rod to unwind and exert a torque on a structure connected to the seat as the seat pivots toward the third, upright position, thereby assisting in the pivoting of the seat toward the third position.

18. A stowable seat assembly for use with a vehicle having a floor and a recess formed therein, said assembly comprising:
a seat;
a pivot member adapted to be secured to the vehicle floor, said pivot member being stationary, said seat being operatively pivotable about said pivot member between a first, collapsed position and a second, stowed position with said seat being at least partially stowed within the vehicle recess, said seat passing through a third, upright position intermediate said first and second positions as said seat is pivoted between said first and second positions; and
a torsion rod mounted on said pivot member, said torsion rod being free to twist and operatively coupled to said seat during pivoting of said seat toward and away from said third, upright position, said torsion rod providing a first biasing torque for assisting pivotal movement of said seat from said second, stowed position toward said third, upright position and a second biasing torque for assisting pivotal movement of said seat from said first, collapsed position toward said third, upright position.

* * * * *